United States Patent [19]

Hopkins

[11] Patent Number: 4,719,660

[45] Date of Patent: Jan. 19, 1988

[54] ICE SCRAPER

[75] Inventor: Ross E. Hopkins, Emporia, Kans.

[73] Assignee: Hopkins Manufacturing Corporation, Emporia, Kans.

[21] Appl. No.: 931,605

[22] Filed: Nov. 17, 1986

[51] Int. Cl.$^4$ .............................. A47L 1/16; B60S 1/04
[52] U.S. Cl. ..................................... 15/105; 15/236 R
[58] Field of Search ............................... 15/236 R, 105

[56] References Cited

U.S. PATENT DOCUMENTS

| | | | |
|---|---|---|---|
| D. 246,414 | 11/1977 | Hopkins et al. | D7/181 |
| 1,018,844 | 2/1912 | Meyer . | |
| 1,950,930 | 4/1932 | Ritter | 306/35 |
| 2,227,528 | 3/1942 | Osborn | 15/236 |
| 2,719,316 | 11/1950 | Hauser | 15/236 |
| 2,770,826 | 9/1954 | Curfman | 15/105 |
| 2,792,584 | 8/1952 | Fryda | 15/236 |
| 2,856,621 | 10/1958 | Racicot | 15/105 |
| 2,946,076 | 3/1959 | Morgan | 15/236 |
| 3,036,322 | 5/1962 | Jorgensen | 15/236 R X |
| 3,261,095 | 5/1964 | Nelson et al. | 30/169 |
| 3,274,684 | 12/1964 | Marks | 30/171 |
| 3,615,572 | 3/1972 | Marich | 30/169 |
| 3,787,921 | 1/1974 | Feldmann | 15/105 |
| 4,040,140 | 8/1977 | Hopkins et al. | 15/236 |
| 4,141,111 | 2/1979 | Hopkins et al. | 15/236 |
| 4,159,839 | 7/1979 | Sigler | 294/1 R |
| 4,164,801 | 8/1979 | Thomas | 15/236 |
| 4,275,476 | 6/1981 | Hopkins et al. | 15/236 |
| 4,293,975 | 10/1981 | Ainsworth | 15/236 R X |
| 4,305,175 | 12/1981 | Burgess | 15/236 R |
| 4,324,018 | 4/1982 | Olsson | 15/236 |
| 4,363,155 | 12/1982 | Regina | 15/105 |
| 4,468,831 | 9/1984 | Schneider | 15/236 |
| 4,517,700 | 5/1985 | Pinto | 15/105 |
| 4,538,320 | 9/1985 | Batt | 15/236 |
| 4,546,513 | 10/1985 | Hammond | 15/105 |
| 4,662,947 | 5/1987 | Hopkins | 15/105 X |

FOREIGN PATENT DOCUMENTS

| | | | |
|---|---|---|---|
| 3121319 | 8/1982 | Fed. Rep. of Germany . | |
| 596817 | 3/1978 | Switzerland | 15/105 |

Primary Examiner—Chris K. Moore
Attorney, Agent, or Firm—Lahive & Cockfield

[57] ABSTRACT

A hand-held ice scraper having an elongate handle portion and a blade attached to one end thereof. The scraping blade is substantially J-shaped and comprises dual outwardly flared scraping arms, one of which is longer and wider than the other. One of the scraping arms has a scraping surface with a smooth, beveled edge while the other features a scraping surface having a plurality of elevated ridges, each ridge having a beveled edge. The blade is firmly secured within the handle portion, preferably be an interference fit.

In one embodiment the scraper has a selectively operable illumination means mounted within the handle portion. The illumination means is adapted to direct light through a translucent blade.

9 Claims, 5 Drawing Figures

ICE SCRAPER

BACKGROUND OF THE INVENTION

This invention relates to scrapers, and more particularly to an improved, hand-held scraper for removing ice and snow from windshields and the like.

A wide variety of ice scraper designs presently exist. Among the more common ice scrapers are those constructed of a polymeric material which comprise a gripping end from which a scraping blade protrudes. Exemplary scrapers are disclosed in U.S. Pat. Nos. 4,040,140 to Hopkins et al; 4,141,111 to Hopkins et al; 4,164,801 to Thomas; and 4,275,476 to Hopkins et al.

In addition, ice scrapers having dual, adjacent scraping blades are also disclosed. For example, U.S. Pat. No. 1,950,930 to Ritter and U.S. Pat. No. 3,787,921 to Feldmann discloses a scraping tool having opposed scraping blades. U.S. Pat. No. 2,770,826 to Curfman discloses a window cleaning tool having a V-shaped head with adjacent scraping and squeegee edges.

An ice scraping tool having a generally U-shaped blade secured to a handle portion is disclosed in U.S. Pat. No. 2,946,076 to Morgan. One arm of the U-shaped blade has a smooth beveled edge while the other arm has a beveled edge interrupted by a number of elevated ridges.

U.S. Pat. No. 3,274,684 to Marks discloses a scraper device having a semi-circular blade portion. One end of the blade is adapted for removing ice and snow from a surface while the remainder of the blade acts as a shield which prevents ice and snow from being discharged onto the hand of the user.

It is an object of the present invention to provide an novel ice scraper which has improved ice deflecting and directing characteristics. A principle object of the invention is to provide an ice scraper with a J-shaped blade, having dual scraping arms, which is adapted to prevent ice and snow from being directed backwardly to the user's hand. Another object of he invention is to provide an ice scraper having a J-shaped blade with one portion of the blade adapted to provide a concentrated scraping force for heavy-duty scraping. A further object of the invention is to provide an ice scraper having an illuminated, heated blade portion. Other objects are to provide an inexpensive, easily fabricated, effective ice scraper.

SUMMARY OF THE INVENTION

The scraper of this invention comprises a contoured handle portion having attached to one end thereof a J-shaped blade. The J-shaped blade is of a unitary construction and has first and second outwardly flared scraping arms. One of the scraping arms has a smooth, beveled edge and is longer and wider than the other scraping arm. The shorter scraping arm preferably features a scraping surface interrupted by a number of grooves. Between each groove is a raised ridge having a beveled edge.

The J-shaped blade is mounted to the handle portion of the scraper and is secured within the handle portion of an elongate anchoring flange which protrudes from a curved base portion of the blade.

In one embodiment of the invention an illumination means is mounted within the handle portion of the scraper. The illumination means is selectively operable to transmit light through the blade. The illumination means may also provide some heating to at least part of the blade.

BRIEF DESCRIPTION OF THE DRAWINGS

These and other objects and feature of the invention will be apparent to those skilled in the art from the following description of a preferred embodiment and from the drawings, in which.

DETAILED DESCRIPTION OF THE DRAWINGS

Figure 1:
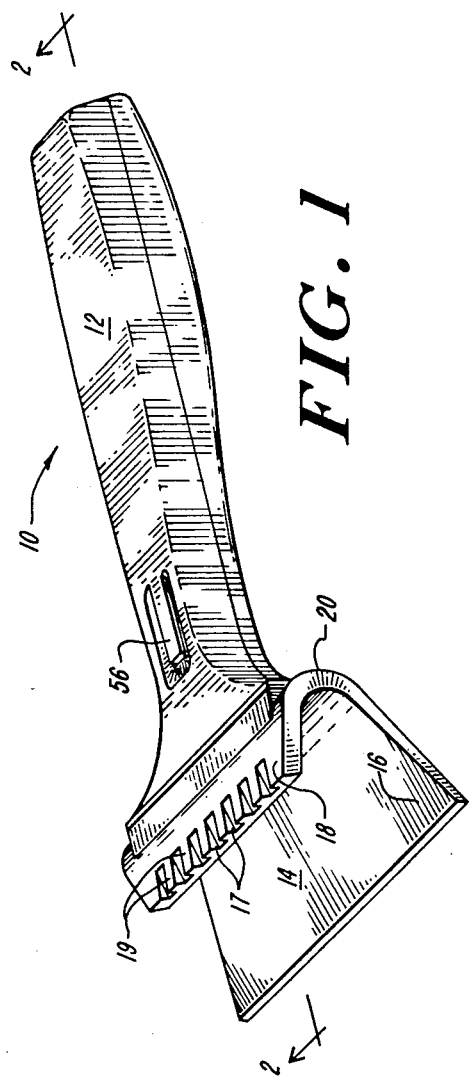
FIG. 1 is a perspective view of the ice scraper embodying this invention.

FIG. 1 illustrates an ice scraper 10 having a handle portion 12 and a blade 14. Blade 14, secured to a forward end of handle portion 12, is substantially J-shaped and is of a unitary construction. Blade 14 comprises two opposed, outwardly flared scraping arms 16, 18 each of which has a scraping edge 23, 25, respectively. Scraping arm 16 is of greater length and width than scraping arm 18. One of the scraping arms, preferably arm 16, has a smooth beveled edge while the other has an edge which features a plurality of grooves 17 each of which is separated by a raised ridge 19 having a beveled edge. Preferably, each ridge is approximately one-eigth inch wide and approximately one-eigth inch in height. Scraping arm 16 progressively increases in width in the direction of scraping edge 23 while scraping arm 18 progressively decreases in width in the direction of scraping edge 25.

Figure 4:
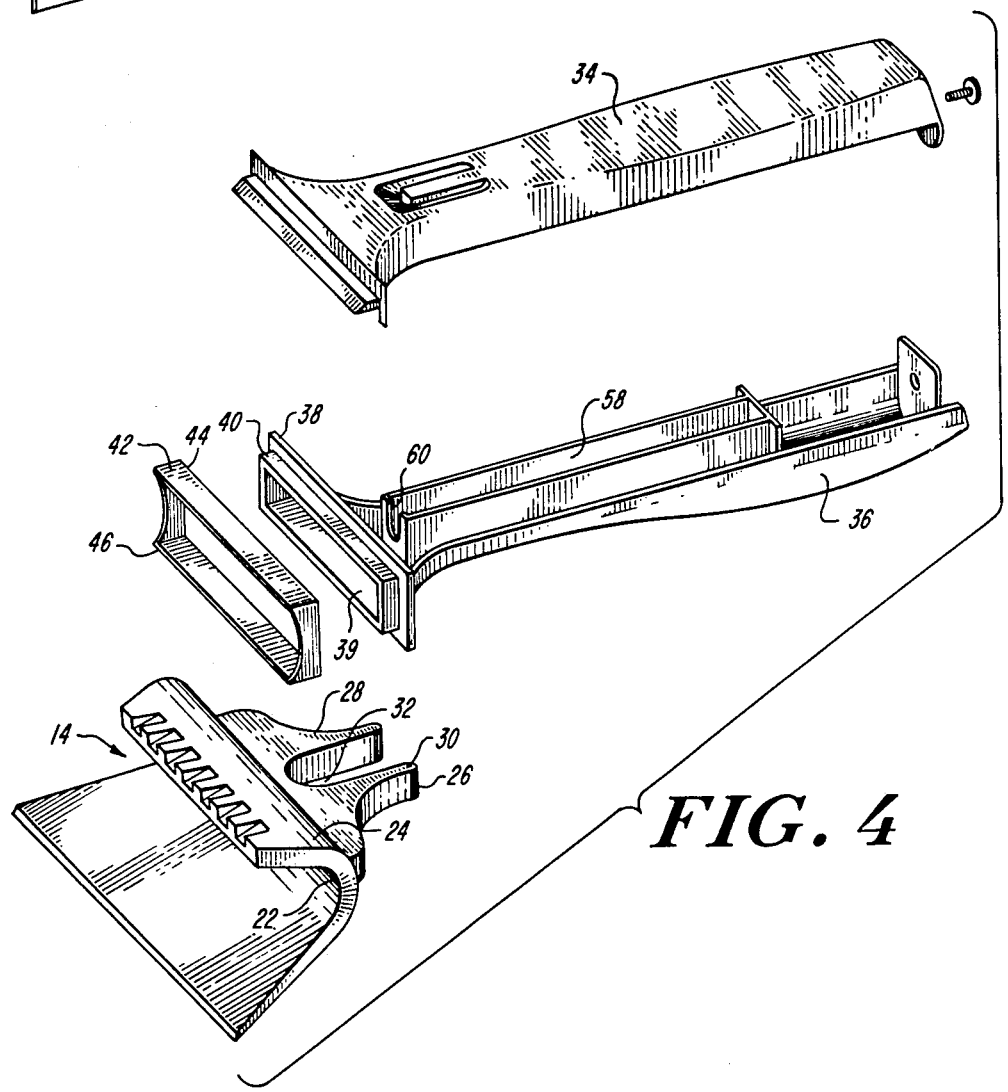
FIG. 4 is an exploded perspective view of the ice scraper of FIG. 1.

As is best illustrated in FIG. 4, blade 14 has a curved base 20 which joins arms 16, 18. Curved base 20 has an inner surface 22 and an outer surface 24. Outer surface 24 also features a protruding anchoring flange 26 integrally joined to the outer surface 24. Flange 26 features adjacent extensions 28, 30 which are separated by elongate aperture 32.

With further reference to FIG. 4, it is shown that handle portion 12 comprises upper segment 34 and lower segment 36. Segments 34 and 36 may be joined together by an interference fit as well as by any numerous other means of joinder known to those skilled in the art. One end of segment 36 features a rectangularly shaped, vertically disposed shoulder 38, having protruding therefrom a rectangular ridge 40. Mounting member 42 is sized to snuggly fit over ridge 40. Additionally, mounting member 42 has a rear surface 44 which mounts flushly against shoulder 38 and a curved forward surface 46 which corresponds to the shape of the outer surface 24 of curved base 20 to firmly seat blade 14 to handle portion 12.

Blade 14 preferably is mounted to handle portion 12 through an interference fit. Mounting member 42 fits over ridge 40 and the rear surface 44 of mounting member 42 flushly engages shoulder 38. The anchoring extensions 28 and 30 of flange 26 are inserted through a rectangular opening 39 which is surrounded by shoulder 38, and into the interior cavity of handle portion 12. Extensions 28 and 30 sandwich a forward portion of housing 58 which is mounted on the inner surface of segment 36. Blade 14 may be further secured within the handle portion 12 by, for example, an interference fit of tabs (not shown) which extend from protrusion 26 and fit within circular apertures (not shown) within segment 36 of handle portion 12. It is understood, of course, that many other mounting techniques may be useful in securing blade 14 to handle portion 12.

Figure 5:
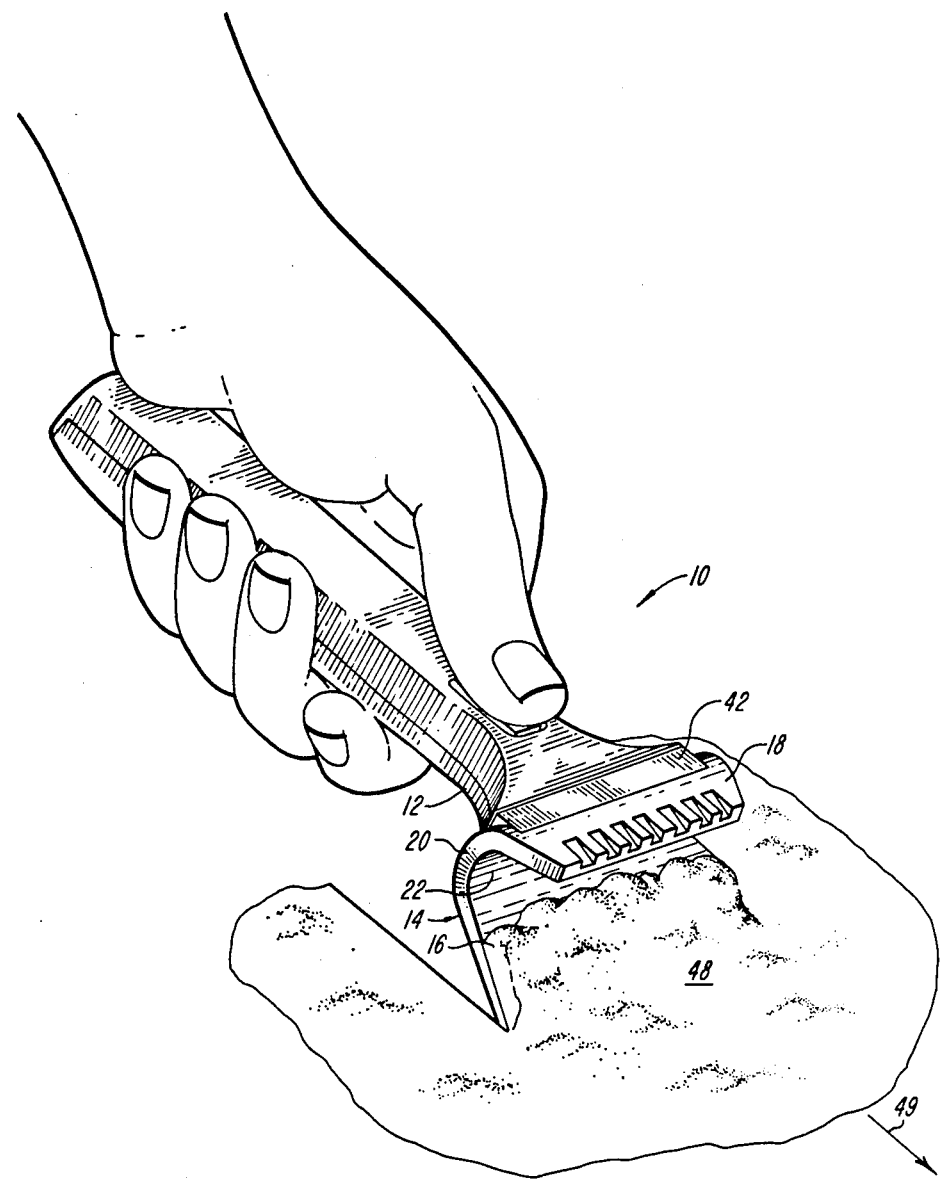
FIG. 5 is a perspective view of the operably disPosed ice scraper of FIG. 1.

As shown in FIG. 5, scraper 10 of the present invention may be used to remove snow or ice 48 from a windshield or like surface. In such an application, inner surface 22 of curved base 20 acts as a block which prevents snow and ice from passing over the scraper blade onto the user's hand. Also, a user may alternatively utilize scraper arms 16 or 18 simply by flipping over the ice scraper. Generally scraper arm 16 is used for the removal of snow, sleet, soft ice or in other light duty scraping operations. Scraper blade 18 is generally desired to be utilized for the removal of hard ice or for other heavy duty scraping operations as it provides a more concentrated scraping force. The outward flaring of scraper arms 16 and 18 results in a generally concave shape of the scraper 10 when either scraping arm 16 or 18 is being used. This enables the user to grip the handle and to apply a scraping force longitudinally (i.e., in the direction of the arrow 49 shown in FIG. 5) of the surface to be scraped without resulting in the user's fingers contacting the surface.

Figure 2:
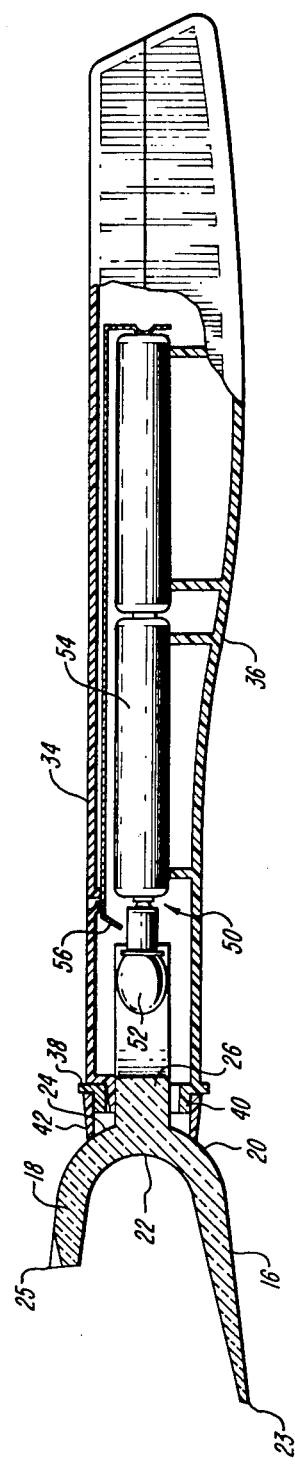
FIG. 2 is a sideview, partially cut away, of the ice scraper of FIG. 1.
Figure 3:
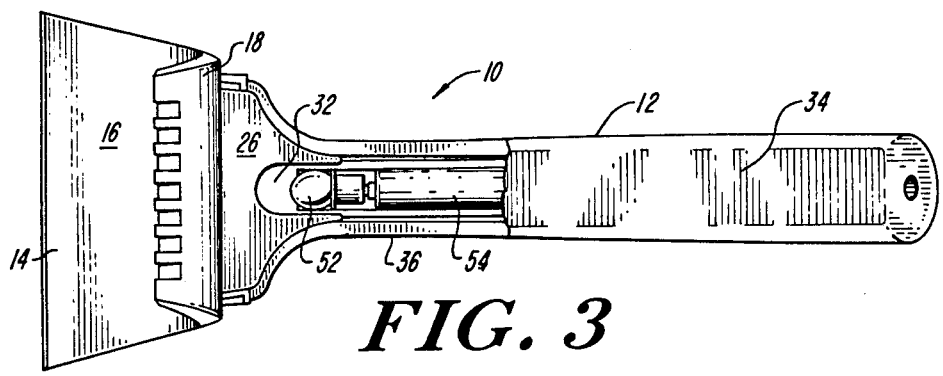
FIG. 3 is a partially cut away top view of the ice scraper of FIG. 1.

In one embodiment, illustrated in FIGS. 2 and 3, the ice scrapper 10 of the present invention may include an illumination means 50. Illumination means 50 comprises a light source 52, an energy source 54 and a switch means 56. Illumination means 50 is mounted within the interior cavity of handle portion 12. The inner surface of segment 36 includes a housing 58 which is adapted to hold the energy source 54. The energy source 54 typically comprises two batteries aligned end to end. The light source 52 which comprises, for example, an incandescent light bulb, extends through aperture 60 in housing 58. A switch means 56 may be mounted on segment 34 of handle portion 12 to allow the light source to be selectively operated.

With illumination means 50 activated, light is directed forwardly through the curved base 20 of blade 14. Blade 14 is preferably constructed of a translucent material such as acrylic or like polymers and thus acts as a lens for the light source. Illumination means 50 is useful in that it illuminates, to some extent, the area being scraped. It is also believed that illumination means 50 may provide a heat source which may warm blade 14 to an extent sufficient to maintain inner surface 22 free of ice and snow.

Ice scraper 10 may be constructed of a wide variety of materials. For example, handle portion 12 may be constructed of virtually any type of material including polymers or metallic compounds. One skilled in the art may easily choose the material which offers the greatest balance of economy and durability to suit the needs of a particular application or market. It is understood, however, that in the embodiment where an illumination means is utilized, blade 14 should be constructed of a translucent material such as acrylic.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A hand-held scraper for removing ice from a surface comprising a handle portion having a gripping end and a blade end; and a substantially J-shaped blade mounted to the blade and of said handle portion, said blade being of a unitary construction and having first and second outwardly flared scraping arms, said first arm being longer than said second arm, ad one of said arms having a smooth beveled edge and the other said arm having a plurality of protruding ridges, wherein each ridge has a beveled edge; said first arm increasing in width from a base portion of the blade to a scraping portion of the blade while said second arm decreases in width from the base to the scraping edge of the blade.

2. The apparatus of claim 1 wherein said blade further includes an elongate anchoring flange which protrudes from a curved base portion of said blade, said flange being secured within said handle portion.

3. The apparatus of claim 2 wherein said blade is constructed of a translucent material.

4. The apparatus of claim 3 further comprising a selectively operable illumination means mounted within said handle portion and adapted to direct light through said blade.

5. The apparatus of claim 3 wherein said blade is constructed of an acrylic polymer.

6. The apparatus of claim 5 wherein said ridges are approximately ⅛ inch in height.

7. The apparatus of claim 2 further including a mounting member disposed between the curved base portion of said blade and the blade end of said handle portion wherein a forward surface of said mounting member has a curved surface corresponding to the curved base portion of said blade for receiving said blade, and a rear surface of said mounting member is substantially flat and is adapted to mount flushly with the blade end of the handle portion.

8. The apparatus of claim 7 wherein said ridges are approximately 150 inch wide.

9. The apparatus of claim 2 wherein the beveled edges of the scraping arms of said blade are forwardly tapered when an arm is in an operably disposed position.

* * * * *